United States Patent [19]

Gullichsen et al.

[11] Patent Number: 4,842,688
[45] Date of Patent: * Jun. 27, 1989

[54] METHOD OF REMOVING MACROMOLECULAR ORGANIC DISSOLVED AND COLLOIDAL MATERIAL FROM WOOD PROCESSING INDUSTRY EFFLUENTS

[75] Inventors: Johan Gullichsen, Sjundea; Pertti Hynninen, Helsinki, both of Finland

[73] Assignee: A. Ahlstrom Corporation, Karhula, Finland

[*] Notice: The portion of the term of this patent subsequent to Mar. 14, 2006 has been disclaimed.

[21] Appl. No.: 122,597

[22] Filed: Nov. 18, 1987

Related U.S. Application Data

[63] Continuation of Ser. No. 905,555, filed as PCT FI86/00017 on Feb. 14, 1986, published as WO86/04888 on Aug. 28, 1986, abandoned.

[30] Foreign Application Priority Data

Feb. 14, 1985 [FI] Finland ................................. 850607

[51] Int. Cl.$^4$ ........................... C02F 1/58; D21C 11/00
[52] U.S. Cl. .......................... 162/29; 162/38; 162/39; 210/713; 210/724; 210/726; 210/928
[58] Field of Search ................ 162/16, 29, 38, 39, 162/190; 210/928, 724, 726, 713

[56] References Cited

U.S. PATENT DOCUMENTS

| | | | |
|---|---|---|---|
| 3,531,370 | 9/1970 | Gould | 162/29 |
| 3,627,679 | 12/1971 | Fuller | 162/29 |
| 4,179,329 | 12/1979 | Svarz | 162/29 |
| 4,490,257 | 12/1984 | Becker | 162/29 |

OTHER PUBLICATIONS

Rydholm, "Pulping Processes"; Interscience Pub., New York, Sep. 1967, p. 849.
Forsell, "New Method of Fiber Recovery from Pulp & Paper Waste Sludge", *Paper Trade Journal*, Mar. 8, 1971 (162-190).
Water Treatment Handbook, pp. 24-32.

*Primary Examiner*—Steve Alvo
*Attorney, Agent, or Firm*—Nixon & Vanderhye

[57] ABSTRACT

A method of removing macromolecular organic dissolved and colloidal compounds from the effluents of a paper and cellulose mill by using waste sludge containing fibers and chemicals. The sludge is acidified to a pH of approx. 2 by a mineral acid prior to adding into the effluent. Organic material is precipitated with fibers in a sedimentation vessel at a pH of 4.5-6.

4 Claims, 1 Drawing Sheet

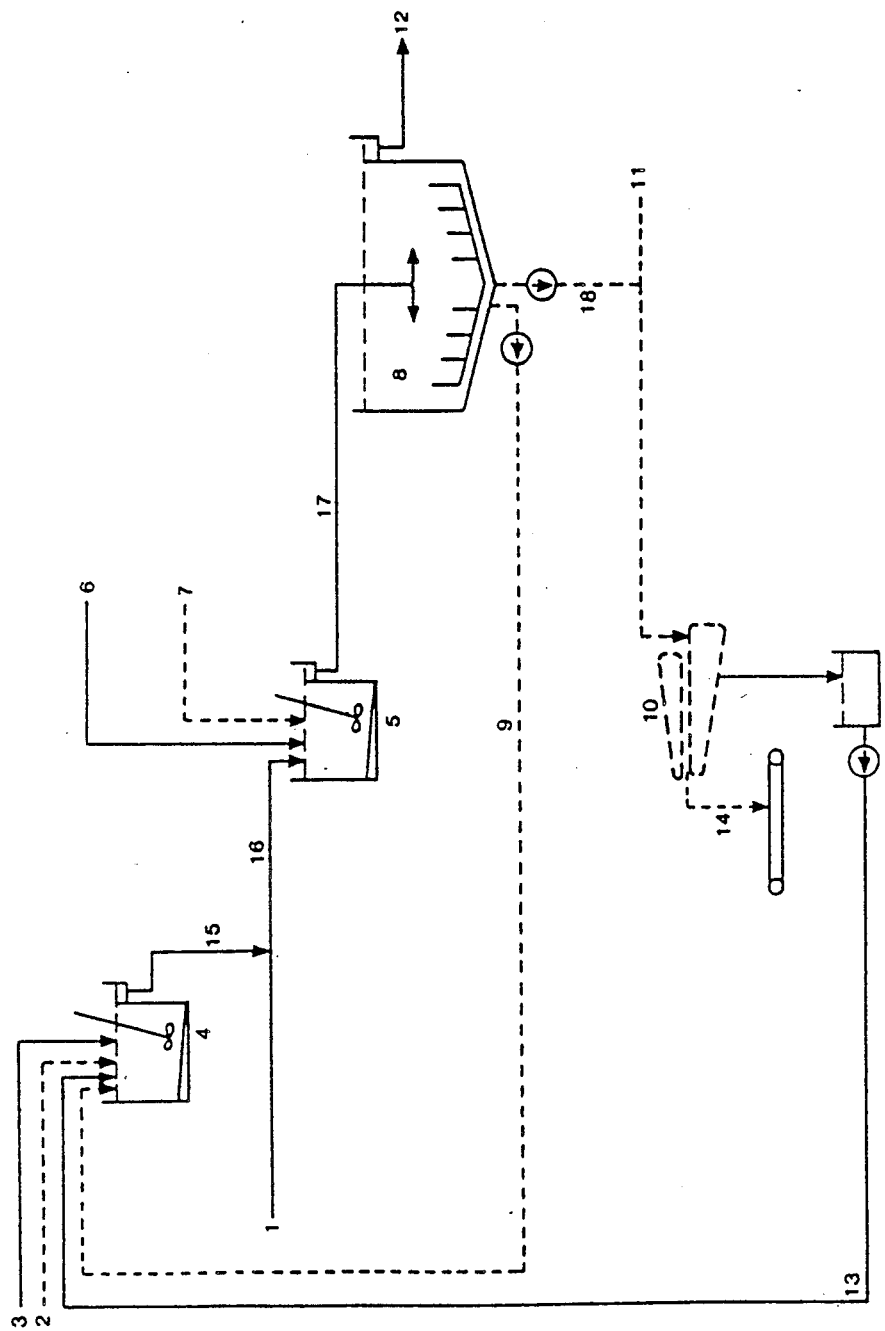

METHOD OF REMOVING MACROMOLECULAR ORGANIC DISSOLVED AND COLLOIDAL MATERIAL FROM WOOD PROCESSING INDUSTRY EFFLUENTS

This is a continuation of application Ser. No. 905,555, filed as PCT FI86/00017 on Feb. 14, 1986, published as WO86/04888 on Aug. 28, 1986, now abandoned.

The effluents from a mill producing chemi-thermomecanical pulp (CTMP) are usually concentrated. The chemical oxygen demand ($COD_{Cr}$) rates are in the order of 5000–15000 mg $O_2/l$ and the solid material amounts 1000–4000 mg/l. The solid material in this type of an effluent is in most cases partly in colloidal state, thus the conventional solids removing method, i.e. sedimentation, has no effect. The effluents from e.g. barking plants and often also the effluents from the production of thermomechanical pulp (TMP) are presently of this type.

When a method of removing lignin from the effluent from a displacement bleach plant was tested, it was also studied how a high sludge concentration in the effluents from a CTMP plant improves the settling property of colloidal solid material. Waste sludge of a paper mill was used as the precipitant, which contains chemicals required in paper making, such as aluminium sulfate, organic polymers and bolus alba.

It was found out that when a waste sludge treated with mineral acid, e.g. sulfuric acid, was added to the effluent from a CTMP plant, organic material was removed from the effluent with the settling sludge. The $COD_{Cr}$ load of the effluent decreased by 30–70% depending on the type of the effluent. Also the amount of solid material decreased and the biological oxygen demand $BOD_7$ decreased by 30–70%.

The results were similar or better than the results received when the same effluents were treated with large amounts of aluminium sulfate.

It is common knowledge that chemical purification carried out with soluble iron, aluminium and calcium salts removes from effluents compounds which are often macromolecular and increase the COD load of the effluent. Despite their several advantages the methods have not been commonly employed. The reasons vary but one of the main obstacles are the somewhat high operation costs the methods involve.

The use of the paper mill waste sludge in purification of effluents has been studied earlier. E.g. Eaton, D.C; Chang, Hm.; and Kirk, T.K. propose in their article "Kraft bleach plant effluent can be decolorized using the synergistic effects of cations solubilized by acidification of waste sludge", published in the Tappi 65 (5):167, 1982, that by acidifying the sludge from a paper mill, e.g. aluminium, iron and calcium compounds are created in the solution. When alkaline bleach water is added in the solution colorful compounds are precipitated. An increase in the pH of the effluent precipitated further colored material.

To recirculate chemicals, also the regeneration of the chemicals of the sludge containing aluminium salts produced in a chemical precipitation process has been studied and tested. E.g. Berov, M.B. and Shapchenko, V.M. suggest in the publication Bumazh. Prom. No. 6:13-14 of June 1978 that by dissolving with sulfuric acid the sludge from a sulfate cellulose mill after the sludge has been precipitated with aluminium sulfate, a solution is created which removes colour from the effluent of a cellulose mill. The undissolved aluminium hydroxide and other alkaline aluminium salts have been converted into aluminium sulfate.

Also the ash of the sludge from cellulose and paper mills has been proposed to be used for purification of domestic sewage (Shuimizu, K; assignee: Orion Kikai Kogyo K.K., Japanese patent Kokai 75, 162/79, June 15, 1979). The sludge from a cellulose and a paper mill has been dried and heated at 1000°–1100° C. The ash received has been mixed with acidic clay. The product received has been suggested to be used in the so-called tertiary purification of domestic sewage.

The laboratory tests which have now been performed have shown that by treating the sludge from a fine paper mill at first with sulfuric acid so as to give it a pH of approx. 2 and adding then 2–3 g d.s. obtained sludge per 1 litre effluent of a CTMP plant, a remarkable amount of organic material was precipitated. Precipitation was intensified when the pH of the effluent was adjusted with calcium to be 4.5–6.

E.g. the $COD_{Cr}$-demand of the effluent from a peroxide bleach process in a CTMP plant was reduced from 5500 mg/l to 2200 mg/l. At the same time the $BOD_7$ load decreased from 2400 mg $O_2/l$ to 1300 mg $O_2/l$. The amount of solid material was reduced from 2000 mg/l to 100 mg/l.

BRIEF DESCRIPTION OF THE DRAWING

The figure shows a schematic diagram of the process.

The method according to the invention is substantially characterized by the feature that the sludge from a paper mill containing e.g. fibres and filler is acidified, e.g. with sulfuric acid, and is added to the effluent from a CTMP plant or other effluents containing large amounts of organic dissolved macromolecular (molar mass over 1000) material. The pH of the sludge is preferably 1.5–2.5.

The invention is described by the following examples:

EXAMPLE 1

Waste sludge from a paper mill was used in tests performed on the bleach and the so-called press waters of CTMP pulp. The sludge contained e.g. fibres, aluminium salts and filler bolus. The sludge was acidified by $H_2SO_4$ to a pH of approx. 2 by efficient mixing. The amount of the sludge was 150 ml and it contained 4 g fibres. The treatment time was 2 minutes.

After this the sludge was added to the effluent to be treated, the amount of which was 850 ml. Finally, the pH of the effluent was adjusted to be 4.8 by adding calcium hydroxide. The precipitated organic material and the fibres were bonded to each other and the dewatering properties of the sludge were improved by adding 3 mg cationic polymer per 1 m³ effluent.

E.g. filtering was tested in the treatment of the sludge, which proved to be quite successfull.

The test on the sludge from a paper mill proved that it can be reused 4–5 times. The required fibre amount was approx. 3–5 kg d.s./m³.

In the tests, the chemical oxygen demand ($COD_{Cr}$) of the effluent from a CTMP plant peroxide bleach process decreased by approx. 60% and the biological oxygen demand by approx. 50 %. The figures of the CTMP plant press waters were 50 % and 40%, respectively. The color index of the press water decreased by 80%.

EXAMPLE 2

The test results has concluded in the flow sheet presented in the enclosed drawing. It is applicable in the treatment of the effluent from the production of both chemi-thermomechanical pulp and other mechanical pulps as well as in the treatment of effluents from a barking plant.

In the drawing the numeral 1 refers to the effluent to be treated. In a mixing vessel 4, acidic sludge mixture 15 is added to it. The sludge mixture is created by mixing sulfuric acid 2 and sludge 3 separated in the effluent treatment plant of a paper mill. Calcium oxide of calcium hydroxide 6 and cationic polymer 7 are agitated into the effluent-sludge mixture 16 in a vessel 5. Mixture 17 is conveyed to a sedimentation vessel 8. Purified water 12 may be conveyed to a waterway or for further treatment e.g. to a biological purification plant for removal of substances of small molecule size.

A part 9 of the sludge is recirculated from the sedimentation vessel to the acidification phase 4. A part 18 of the sludge, to which cationic polymer 11 is added, is conveyed to a filter belt press 10. The sludge 14, which has been dried to a d.s. content of approx. 40%, is transported for further treatment.

EXAMPLE 3

The main dimensions of a purification plant required for the combined effluents of a mill producing 500 t chemi-thermomechanical pulp per day:

| effluent | m³/h | 300 |
| --- | --- | --- |
| sludge amount (addition and removal) | kg/h | 250 |
| sludge to be recirculated | kg/h | 650 |
| polymer amount | kg/h | 1.5-2.0 |
| acid amount 0.1 N H₂SO₄ | kg/h | 3 |
| volume of sludge acidification vessel | m³ | 0.5 |
| volume of effluent-sludge mixture neutralization vessel | m³ | 10 |
| sedimentation vessel volume | m³ | 1250 |
| area | m² | 250 |

We claim:

1. A method of removing macromolecular organic dissolved and colloidal compounds from paper and cellulose mill effluents, comprising the steps of:
   (a) acidifying a waste sludge containing cellulosic fibers so that it has a pH in the range of 1.5-2.5;
   (b) adding the acidified waste sludge to the effluent, to produce a sludge-effluent mixture;
   (c) adding a material selected from the group consisting of calcium or calcium hydroxide to the effluent-sludge mixture so that the pH of the mixture is within the range of 4.5-60 so that precipitation of fibers therefrom is facilitated and macromolecular organic dissolved and colloidal compounds are bound to said fibers; and
   (d) separating the fraction containing fibers, with said macromolecular organic dissolved and colloidal compounds bound thereto, from the sludge-effluent mixture by precipitation in a sedimentation vessel; and
   (e) taking a portion of the fraction containing fibers that have separated in step (d), and recirculating it as waste sludge to step (a).

2. A method as recited in claim 1 wherein the waste sludge is sludge from a paper mill containing cellulosic fibers and filler.

3. A method as recited in claim 1 wherein step (b) is practiced to add sufficient acidified fiber to the effluent so that there is at least 2 kilograms of fiber per cubic meter of effluent.

4. A method as recited in claim 1 comprising the further step of adding to the sludge-effluent mixture, at the same time that the calcium or calcium hydroxide are added to the mixture, 1-4 grams of cationic polymer per cubic meter of the effluent.

* * * * *

UNITED STATES PATENT AND TRADEMARK OFFICE
CERTIFICATE OF CORRECTION

PATENT NO. : 4,842,688
DATED : June 27, 1989
INVENTOR(S) : Gullichsen et al.

It is certified that error appears in the above-identified patent and that said Letters Patent is hereby corrected as shown below: On the title page:

The Assignee on the patent cover sheet should read
--KAMYR AB, Karlstad, Sweden--.

Signed and Sealed this

Seventeenth Day of July, 1990

*Attest:*

HARRY F. MANBECK, JR.

*Attesting Officer*      *Commissioner of Patents and Trademarks*